United States Patent
DiFrancesco et al.

(10) Patent No.: US 6,628,442 B1
(45) Date of Patent: Sep. 30, 2003

(54) METHOD AND APPARATUS FOR BEAM DEFLECTION USING MULTIPLE BEAM SCANNING GALVANOMETERS

(75) Inventors: David DiFrancesco, San Francisco, CA (US); James Burgess, Richmond, CA (US)

(73) Assignee: Pixar Animation Studios, Emeryville, CA (US)

( * ) Notice: Subject to any disclaimer, the term of this patent is extended or adjusted under 35 U.S.C. 154(b) by 0 days.

(21) Appl. No.: 09/556,489

(22) Filed: Apr. 21, 2000

(51) Int. Cl.⁷ .............................................. G02B 26/08
(52) U.S. Cl. ..................................... 359/202; 359/204
(58) Field of Search ................................ 359/201, 202, 359/204, 205, 212, 213; 250/230, 578.1, 234, 235, 236

(56) References Cited

U.S. PATENT DOCUMENTS

| | | | | |
|---|---|---|---|---|
| 4,314,154 A | * | 2/1982 | Minoura et al. | 250/235 |
| 4,509,819 A | * | 4/1985 | Sherman et al. | 359/204 |
| 4,947,039 A | * | 8/1990 | Lawson et al. | 250/236 |
| 5,035,476 A | * | 7/1991 | Ellis et al. | 250/224 |
| 5,097,356 A | * | 3/1992 | Paulsen | 359/214 |
| 5,185,676 A | * | 2/1993 | Nishiberi | 359/202 |
| 5,430,666 A | * | 7/1995 | DeAngelis et al. | 346/109 |
| 5,532,873 A | * | 7/1996 | Dixon | 359/368 |
| 5,831,757 A | * | 11/1998 | DiFrancesco | 359/202 |
| 6,034,804 A | * | 3/2000 | Bashkansky et al. | 359/201 |
| 6,057,967 A | * | 5/2000 | Takahashi et al. | 359/196 |
| 6,134,002 A | * | 10/2000 | Stimson et al. | 250/458.1 |

* cited by examiner

Primary Examiner—Euncha Cherry
(74) Attorney, Agent, or Firm—Townsend and Townsend and Crew LLP

(57) ABSTRACT

The invention is a method and apparatus for deflecting a beam using multiple beam scanning galvanometers. One or more embodiments of the invention comprise a system for deflecting an energy beam comprising a first reflective surface for directing an incident beam, a first galvanometer coupled to the first reflective surface for rotating the first reflective surface about a first axis, a second reflective surface for directing the incident beam after directed by the first reflective surface, and a second galvanometer coupled to the second reflective surface for rotating the second reflective surface about a second axis, the second galvanometer positioned remote from the first galvanometer. In one or more embodiments, the system is a part of a laser film recorder. In such an embodiment, the incident beam comprises combined red, green and blue laser beams. The incident beam is directed by the second reflective surface at a film surface.

18 Claims, 7 Drawing Sheets

METHOD AND APPARATUS FOR BEAM DEFLECTION USING MULTIPLE BEAM SCANNING GALVANOMETERS

BACKGROUND OF THE INVENTION

1. Field of the Invention

The present invention relates to beam scanning galvanometers generally, and more specifically, to an arrangement of multiple galvanometers for use in a laser film recording apparatus.

2. Background Art

As one means of recording an image on film, light is selectively introduced to the film in different areas over time, such that the effect of the combined exposures is a composite image. In one known arrangement, a laser beam is focused upon a frame of film. The laser beam is utilized to record a single pixel of an image onto the film. The laser beam is selectively directed at different areas of the frame of film in scan line sequential fashion to generate the composite image. In such an arrangement, beams of red, green and blue light are directed at the frame of film so that a color image is recorded by the film. The process of directing the laser beam at the film must be done with utmost precision or else the resultant image will suffer from visible defects.

In addition, in order for the image to have high resolution, the number of individual pixels or spots on the film which are individually exposed must be very large. The number of individually exposed pixels or spots on a frame of film may be 4000×4000 or more. Thus, in order to expose thousands of frames for a motion picture presentation, the spots are exposed at very high speed, with very high precision spot placement accuracy.

It is known to use a galvanometer to control a reflective surface which is used to deflect a light beam. In such an arrangement, a galvanometer is connected to a mirror and moves the mirror, such as in an oscillating motion. In the case of a laser film recorder, the mirror may be used to deflect the laser beam which exposes the film.

When recording a frame of film, the individual pixels or areas which are exposed by the laser beam are arranged in a Cartesian coordinate system. Pixels are arranged in rows (parallel to an "x"-axis) and columns (parallel to a "y"-axis). In order to record each pixel, the laser beam and/or film must be moved in both the "x" and "y" directions.

In prior arrangements, the laser beam is directed over the film in the "x" direction using a mirror controlled galvanometer. The film is then moved in the "y" direction with respect to the beam. Such arrangements have numerous drawbacks which are well known, including complex film drives and controls.

In order to avoid the shortcomings of systems in which the film is moved, some systems have been devised in which a mirror-controlled galvanometer is used to direct the laser beam in one dimension, and then the entire galvanometer is mounted to a rotary head unit for moving the entire device to direct the beam in the other dimension. Such a system is disclosed in U.S. Pat. No. 5,831,757 having the same inventor and assignee as herein.

This system constitutes an improvement over prior systems. Still, the rate at which the beams may be scanned over the film using this system is limited due to limitations in controlling the movement of the entire device in the required precise manner. When producing a film having thousands of frames, it is desirable to be able to scan the film as quickly as possible.

An improved method and apparatus for deflecting light beams at high frequency for recording film is desired.

SUMMARY OF THE INVENTION

The invention is a method and apparatus for deflecting one or more beams using multiple beam scanning galvanometers.

One or more embodiments of the invention comprise a system for deflecting a beam of energy comprising a first reflective surface for directing an incident beam, a first galvanometer coupled to the first reflective surface for rotating the first reflective surface about a first axis, a second reflective surface for directing the incident beam after directed by the first reflective surface, and a second galvanometer coupled to the second reflective surface for rotating the second reflective surface about a second axis, the second galvanometer positioned remotely from the first galvanometer.

In one or more embodiments, the system is a part of a laser film recorder. In such an embodiment, the incident beam comprises combined red, green and blue laser beams. The incident beam is directed by the second reflective surface at a film surface.

One or more embodiments of the invention comprise a method for directing an incident beam, the method comprising the steps of providing a first reflective surface for directing an incident beam, providing a first galvanometer coupled to the first reflective surface for rotating the first reflective surface about a first axis, providing a second reflective surface for directing the incident beam after directed by the first reflective surface, providing a second galvanometer coupled to the second reflective surface for rotating the second reflective surface about a second axis, and locating the second galvanometer remote from the first galvanometer.

Further objects, features, and advantages of the present invention over the prior art will become apparent from the detailed description of the drawings which follows, when considered with the attached figures.

BRIEF DESCRIPTION OF THE DRAWINGS

FIG. 1 is a schematic illustration of a laser film recorder including two galvanometer controlled mirrors in accordance with the present invention;

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In some instances, well-known features may have not been described in detail so as not to obscure the invention.

In general, the present invention relates to an arrangement for multiple beam scanning galvanometers of the type utilized to control mirrors for deflecting incident beams. It will be appreciated that the arrangement of galvanometers as disclosed herein may be used in a wide variety of settings and for a wide variety of purposes. In one or more embodiments, as disclosed in detail below, the arrangement of galvanometers may be used in a laser film recording system. Those of skill in the art will appreciate after reading the disclosure herein that the arrangement may be useful in a scanner or other arrangements where multiple galvanometers are to be employed.

Figure 1:
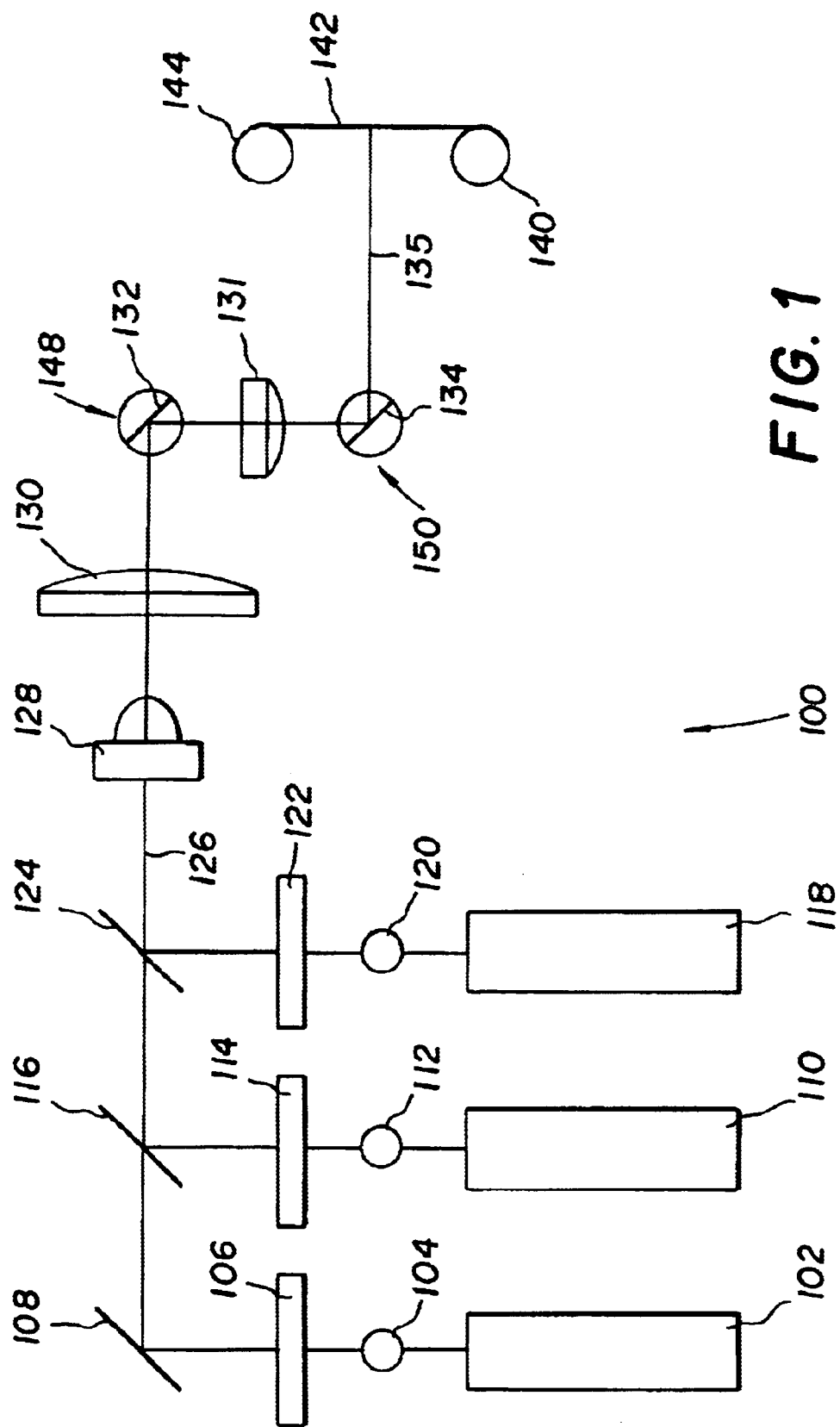
FIG. 1 is a block diagram of one embodiment of a computer system capable of providing a suitable execution environment for an embodiment of the invention.

One or more embodiments of the invention will be described in conjunction with a laser film recorder 100. FIG. 1 diagrammatically illustrates such a laser film recorder 100.

A laser 102 produces a red beam that is directed through a modulator 104 and neutral density filter wheel 106 to a mirror 108. A laser 110 produces a green beam that is directed through a modulator 112 and neutral density filter wheel 114 to a beam splitter 116. A laser 118 produces a blue beam that is directed through a modulator 120 and neutral density filter wheel 122 to a beam splitter 124.

Each of the lasers 102, 110, 118 may be of a variety of types now known or later developed. The modulators 102, 112, 120 may be electro-optical modulators, accousto-optical modulators, or any other modulators now known or later developed. The neutral density filter wheels 106, 114, 122 provide variable attenuation of the laser beams. Alternatively, other devices may be used to provide variable attenuation, such as polarizing material or liquid crystal devices.

The mirror 108 directs the red laser beam from red laser 102 along a first optical axis 126. The beam splitter 116 combines the green laser beam from the green laser 110 with the red laser beam along the first optical axis 126. The beam splitter 124 combines the blue laser beam from the blue laser 118 with the red and green laser beams along the first optical axis 126. The mirror 108 and beam splitters 116,124 aid in arranging the system in a compact fashion and allow for precise collinear alignment of the three beams.

The combined beam produced from the red, green and blue beams is directed collinearly through a beam expander 128, which forms the combined beam into the proper size and shape for imaging. After passing through the beam expander 128, the combined beam is directed through a collimating lens 130. The collimating lens 130 directs the combined beam towards a first reflective surface in the form of a first mirror 132.

Figure 2:
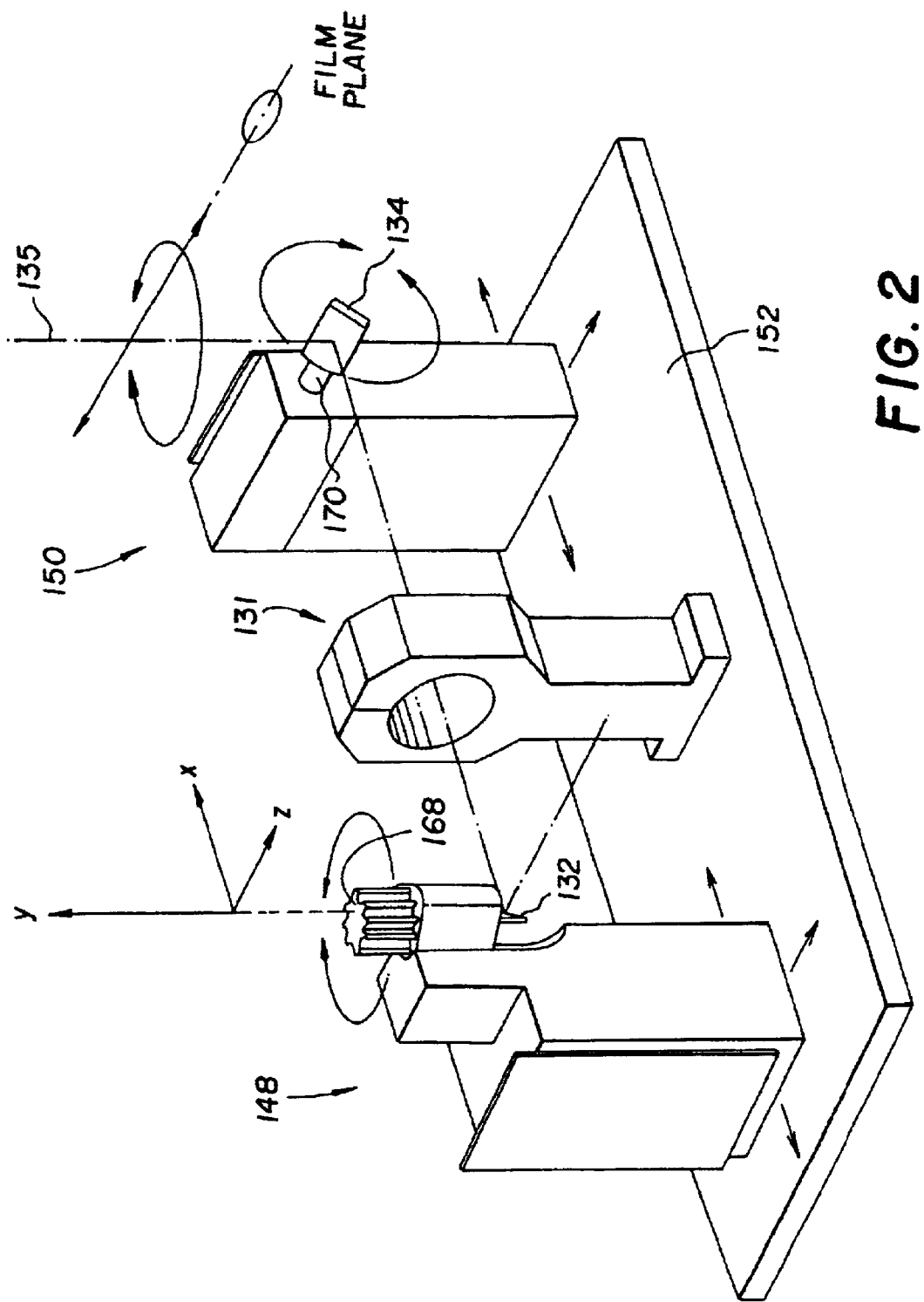
FIG. 2 is a perspective schematic view of de-coupled "x" and "y" scanning galvanometers arranged in accordance with the present invention.

The combined beam is deflected off of the first mirror 132 and directed at a second reflective surface in the form of a second mirror 134. In one or more embodiments, and as illustrated in FIG. 2, the deflected combined beam is directed through a scan lens 131. The combined beam is deflected off of the second mirror 134 along a second optical axis 135 to the film plane.

A film transport comprising a film supply reel 140, film plane 142 and film take-up reel 144 is positioned such that the combined beam which is deflected off of the second mirror 134 is directed across the film plane 142. When used to record film, unexposed film is provided on the film supply reel 140. A frame of unexposed film to be exposed is positioned on the film plane 142. The film is exposed by being illuminated by the combined beam. After the frame has been exposed., the film is advanced such that the exposed frame is stored on the take-up reel 144.

The described film recorder 100 is for illustration purposes only, and it will be understood that in one or more embodiments of the invention, the film recorder 100 may vary from that described above.

In accordance with the present invention, means are provided for moving the first and second mirrors 132,134 so as to control the direction of the deflected, combined beam. In accordance one embodiment of the invention, a first galvanometer 148 is provided for moving the first mirror 132. A second galvanometer 150 is provided for moving the second mirror 134.

The arrangement of these galvanometers 148,150 and their associated mirrors 132,134 will be described first with reference to FIG. 2. As illustrated therein, the first mirror 132 is mounted for rotation about a "Y"-axis. In such an arrangement, movement of the mirror 132 changes the direction of the deflected, combined beam parallel to an "x" axis (i.e. in an "xz" plane). The second mirror 134 is mounted for rotation about the "z" axis. In such an arrangement, movement of the mirror 134 changes the direction of the deflected, combined beam parallel to the "y" axis (i.e. in a "yz" plane). In this arrangement, the first galvanometer 148 may be referred to as the "x" scanning galvanometer, while the second galvanometer 150 may be referred to as the "y" scanning galvanometer.

The "x" and "y" scanning galvanometers 148,150 may be of a variety of types. Preferably, the two galvanometers 148,150 are of the bearing-less, flexure or "deflection" type. Such galvanometers 148,150 are known. U.S. Pat. No. 5,280,377 describes one arrangement of a deflection type beam scanning galvanometer. The disclosure of this patent is incorporated herein by reference.

In general, each galvanometer 148,150 has a "motor" for driving or moving it. In one or more embodiments, the motor comprises a driving coil (not shown) associated with a driving magnet (not shown). This type of motor is disclosed in U.S. Pat. No. 5,280,377. When current is applied to the driving coil, the driving magnet rotates against springs or other flexure devices with which the scanning mirror is associated. Applying opposite currents the mirror is moved first in one direction (by rotation of the magnet in one direction) and then in at second direction (by the flexure devices).

Figure 3:
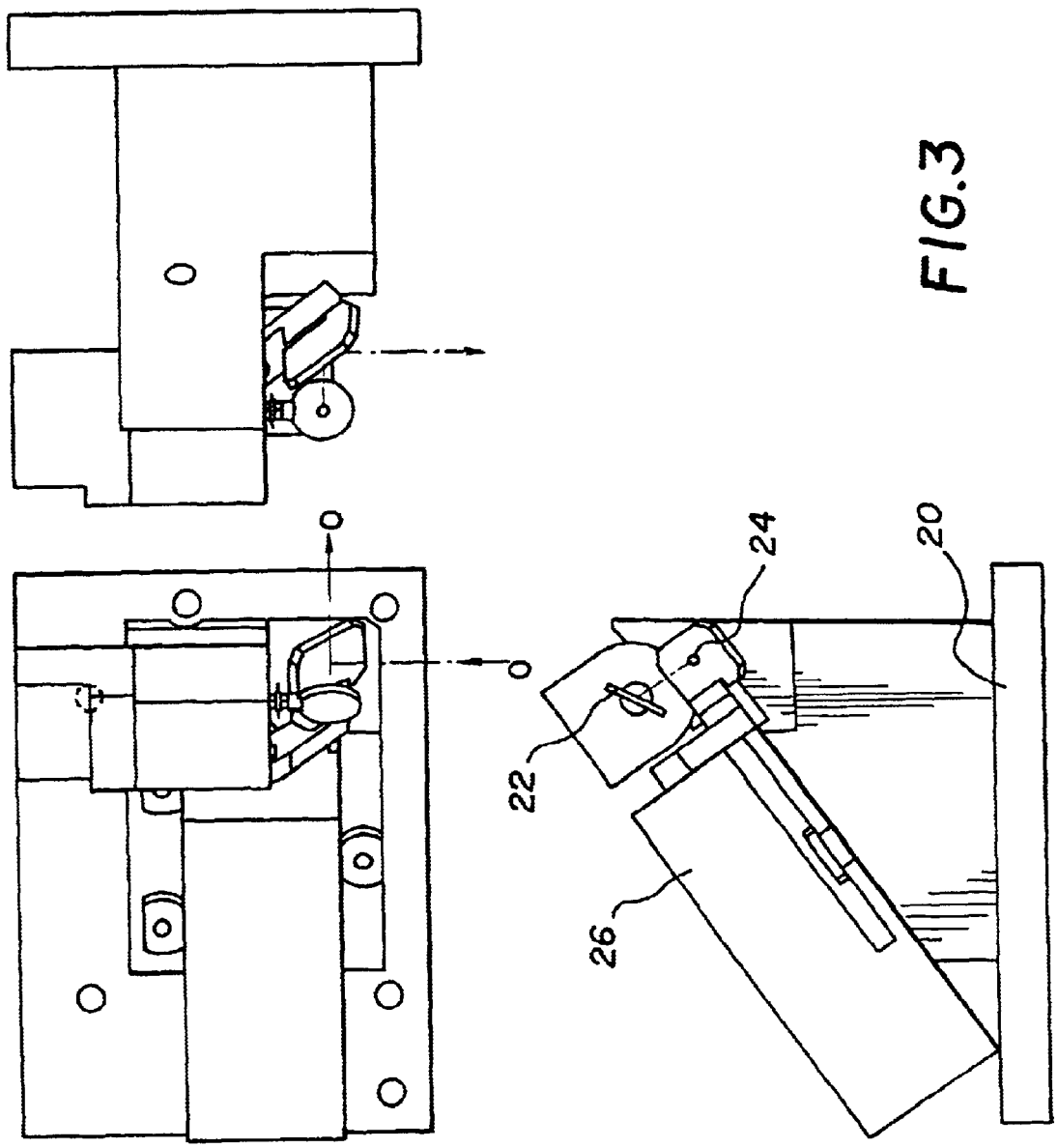
FIG. 3 illustrates an arrangement of coupled "x" and "y" axis mirror-deflecting galvanometers.

Referring to FIG. 3, there is illustrated one arrangement of galvanometers for use in controlling two mirrors for deflecting the laser beam which was attempted by the inventor. As illustrated therein, a common mounting platform 20 is provided for the galvanometers. First and second motors for driving the two mirrors 22,24 are supported by a common support structure 26. The motors and mirrors are compactly arranged in a "coupled" relationship.

At low film scanning frequencies, such as 50 Hz, relatively good results can be obtained with such a "coupled" galvanometer system. As described above, however, it is desirable to scan the film at much higher speeds, as a single frame of film may take 50 seconds to expose at this speed. At low scanning speeds, the economic viability of creating an entire film is threatened. When such a system of coupled galvanometers is operated at higher film scanning frequencies, however, numerous undesirable problems occur. Banding, pixel placement error and repeatability problems all become problems as the frequency is increased.

Banding problems result when the Gaussian curves represented by the scanning lasers moving across the film move with respect to one another. The banding generally results in a viewer seeing a black line on the film. Repeatable pixel placement is necessary to ensure that the pixels on each line, in each frame, are aligned. If not aligned, various undesirable visible effects may occur, including blurring and unsteady characteristics. These problems generate visual defects in the recorded image on the film, rendering the images unacceptable.

To overcome the problems associated with the attempted arrangement illustrated in FIG. 3, there is provided the embodiment of the invention illustrated in FIGS. 2 and 4–7. The arrangement of the galvanometers 148,150 and their structure in accordance with this embodiment will now be described in greater detail with, reference to these figures.

Figure 4:
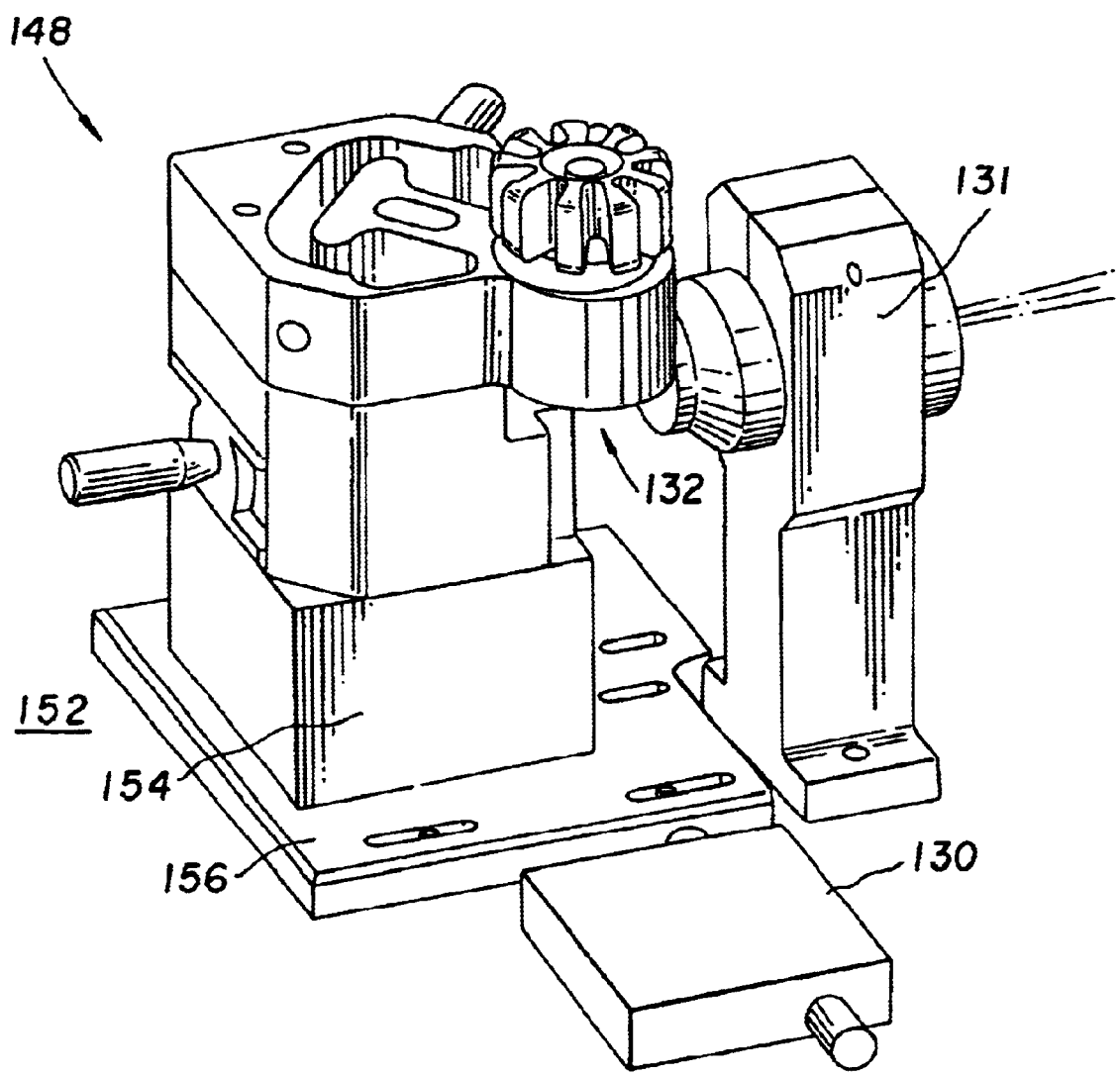
FIG. 4 is a detailed perspective view of an "x" scanning galvanometer in accordance with the invention along with an associated scan lens.
Figure 6:
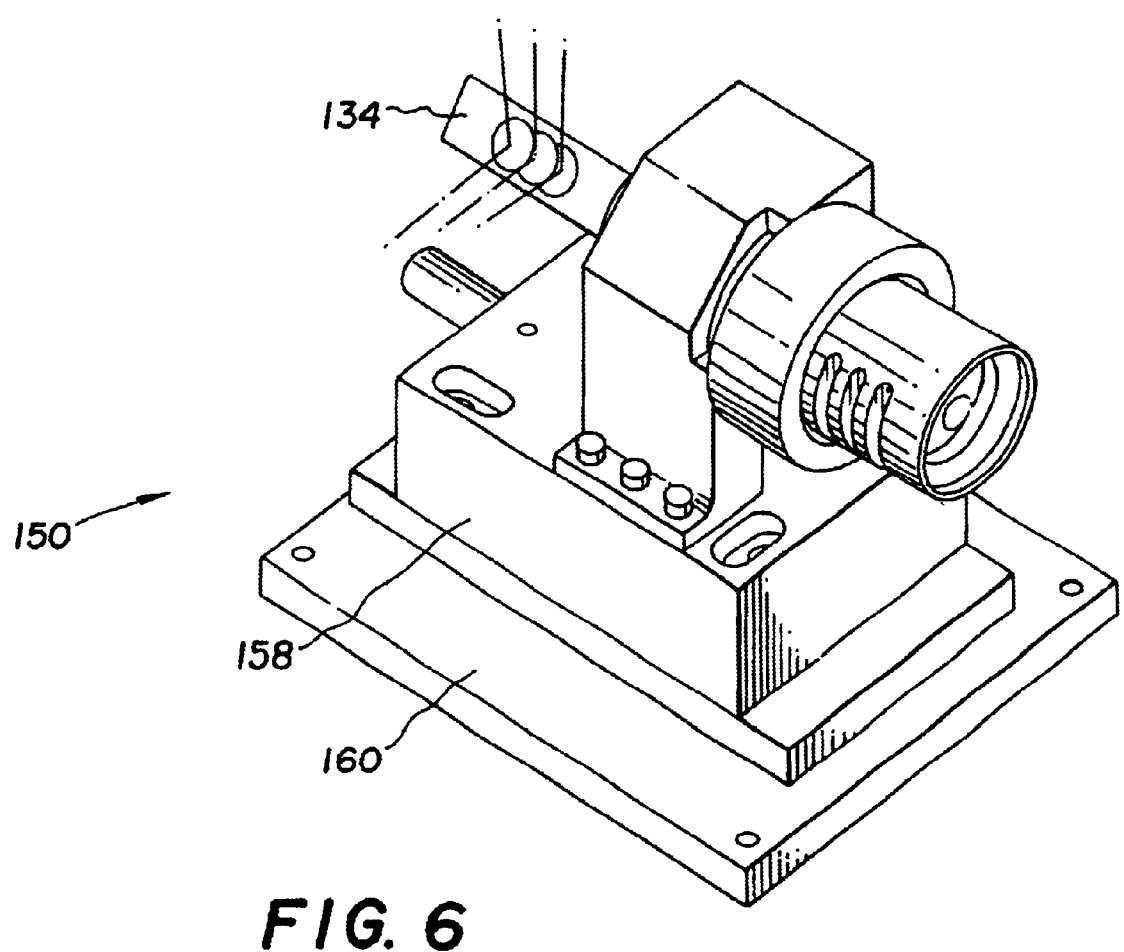
FIG. 6 is a detailed perspective view of a "y" scanning galvanometer in accordance with the invention.

As illustrated in FIG. 4, the "x" scanning galvanometer 148 has a supporting body 154. This body 154 is mounted to a planar supporting base 156. As illustrated in FIG. 6, the "y" scanning galvanometer 150 likewise has a supporting body 158. This body 158 is mounted to a generally planar supporting base 160.

Most importantly, and as illustrated generally in FIG. 2, the "x" and "y" scanning galvanometers 148,150 are not coupled to one another, and are located some distance apart. In one or more embodiments, the galvanometers 148,150 are each mounted to a common support 152. The common support 152 is preferably a vibration isolation unit or damping element. In one or more other embodiments, the galvanometers 148,150 are each mounted to separate (except being both supported by the earth) supports. In any event, the distance of separation for the "x" and "y" scanning galvanometers 148,150 is chosen so that neither galvanometer affects the operation of the other. In one or more embodiments, the galvanometers 148,150 are separated by at least about 3 mm. In one or more embodiments, the galvanometers 148,150 may be separated by as much as 200 mm or more. The above-described mounting and separation is useful in both mechanically (i.e. vibration damping) and electrically (field isolation) isolating the galvanometers.

Figure 5:
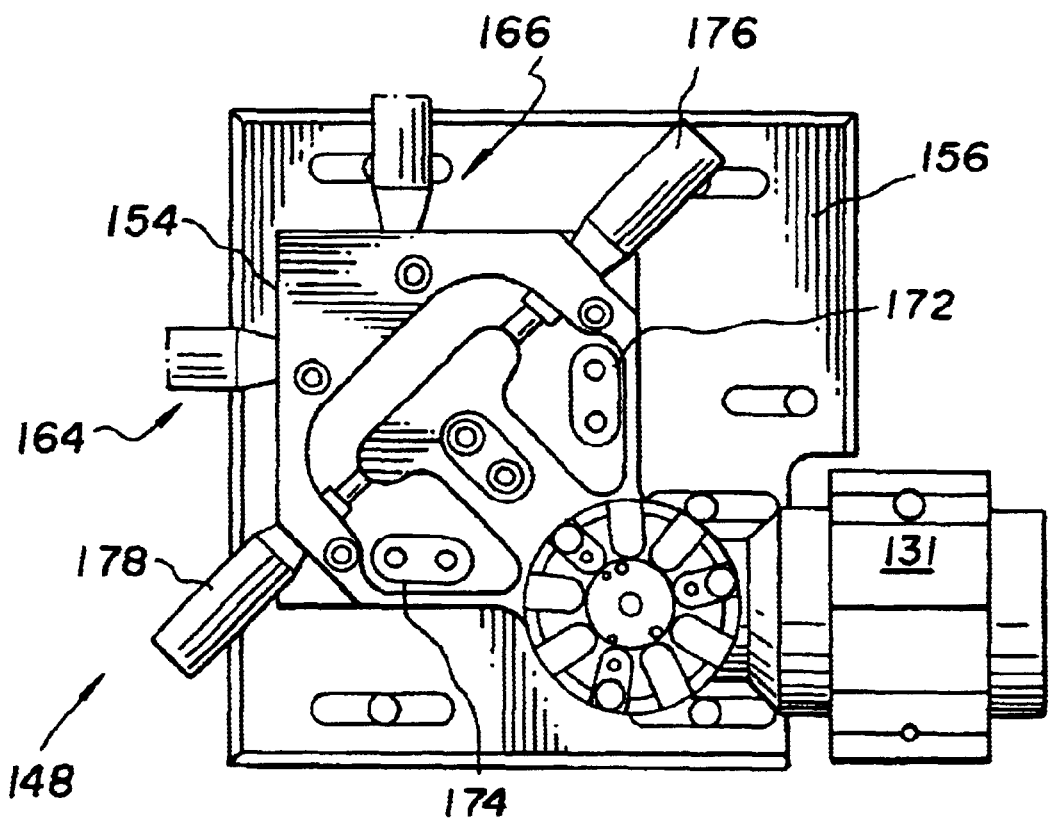
FIG. 5 is a top view of the "x" scanning galvanometer illustrated in FIG. 4.

Referring also to FIGS. 4 and 5, in the embodiment illustrated, the "x"-scanning galvanometer 148 is arranged to rotate the first mirror 132 about the "y"-axis. In one or more embodiments, the "x" scanning galvanometer 148 is mounted for movement in one or more directions. As illustrated, the "x" scanning galvanometer 148 may be moved along a "z"-axis (parallel to the optical axis 126) and along the "x" axis. In one or more embodiments, the mount adjustment provides for at least +/−1.5 mm of movement in each direction to permit optical adjustment.

The "x" scanning galvanometer 148 may be mounted for manual or automated adjustment in these directions. For example, the "x" scanning galvanometer 148 is mounted on a flexure to enable maximum positioning (See FIG. 4 detail).

Figure 7:
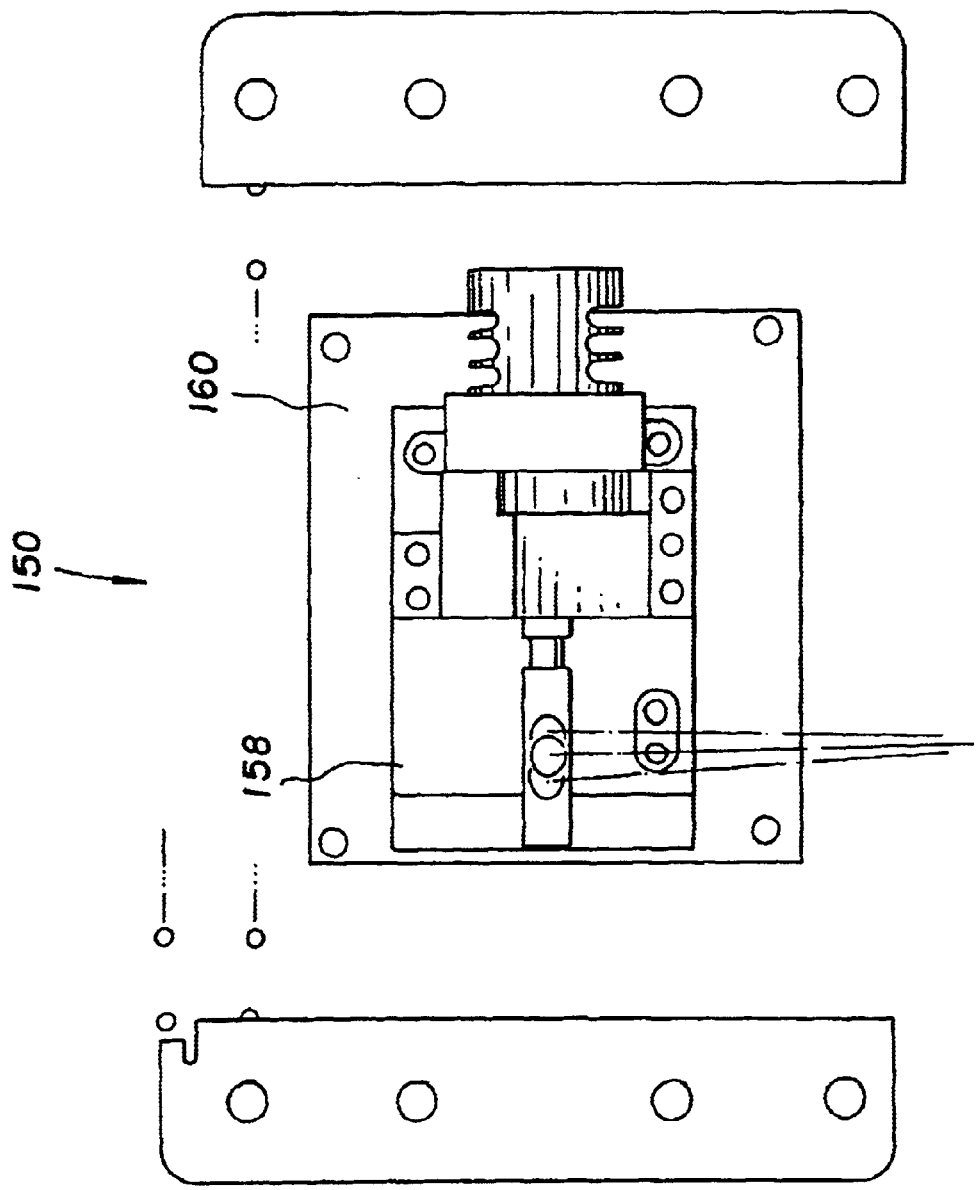
FIG. 7 is a top view of the "y" scanning galvanometer illustrated in FIG. 6.

Referring to FIGS. 3 and 6–7, in the embodiment illustrated, the "y"-scanning galvanometer 150 is arranged to rotate the second mirror 134 about the "x"-axis. In one or more embodiments, the "y" scanning galvanometer 150 is mounted for movement in one or more directions. As illustrated, the "y"-scanning galvanometer 150 may be moved along a "z"-axis (parallel to the optical axis 126) and along the "x" axis. As with the "x" scanning galvanometer 148, the "y" scanning galvanometer 150 may be arranged in a number of configurations permitting movement, both manual and automated. In one or more embodiments, the mount adjustment provides for at least +/−1.5 mm of movement in each direction to permit optical adjustment.

In one or more embodiments, either or both the "x" and "y" scanning galvanometers 148,150 may be arranged to provide for a "coarse" and "fine" adjustment. In such an arrangement, the galvanometers 148,150 may be moved relatively large distances quickly, and very small distances in a slower, but more precise manner. Referring to FIG. 4, the "x" scanning galvanometer 148 is arranged for coarse adjustment by selectively mounting the base 156 with which the galvanometer 148 is associated to the support 122. The "x" scanning galvanometer 148 is arranged for fine adjustment by adjustable mounting of the galvanometer to the body 154. As illustrated, the "x" scanning galvanometer 148 is mounted to the body 154 on a track arrangement for adjustment. A user may use first and second control knobs 164,166 to move screws for moving the galvanometer 148 along these tracks for fine adjustment. In addition, first and second walls 172,174 of the body 154 serve as flexure mounts for the galvanometer 148 (see FIG. 5). First and second micrometers 176,178 are arranged to move these walls 172,174, thus effecting a change position of the galvanometer 148. Though not illustrated in detail, the "y" scanning galvanometer 150 may be similarly arranged. Of course, those of skill in the art will appreciate that there are numerous arrangements by which the galvanometers 148, 150 may be arranged for selective positioning.

It should be understood that the orientation of the "x," "y" and "z" axis illustrated and the designations of these axis and the galvanometers 148,150 is arbitrary. In general, the first and second galvanometers 148,150 are arranged to selectively direct the combined laser beam in two directions on the film: one direction parallel to a width of the film (i.e. corresponding to a direction along a "row" of pixels on the film), and one direction parallel to a length of the film (i.e. corresponding to a direction down the rows of pixels).

As described above, the "x" and "y" scanning galvanometers 148,150 are arranged to move respective mirrors 132,134. These mirrors 132,134 may be of a variety of types, as well known in the art. As illustrated, each mirror 132,134 is constructed from Pyrex 7740 and has an enhanced silver coating.

In one or more embodiments, the first mirror 130 comprises a generally circular mirror having a diameter of about 20 mm. In one or more embodiments, the second mirror 132 is generally rectangular and has dimensions of about 20 mm (high, i.e. in the "y" direction as illustrated in FIG. 2), about 35 mm wide, and about 6 mm thick.

In one or more embodiments, each mirror 130,132 is attached to a respective "drive" shaft 168,170 (see FIG. 2) of its associated galvanometer 148,150. The mirrors 130,132 may be attached to their respective shafts in a number of configurations. In one or more embodiments, the first mirror 130 is attached to the shaft of the "x" scanning galvanometer 148 by direct bonding. In one or more embodiments, the second mirror 132 is attached to the shaft of the "y" scanning galvanometer 150 by use of a mounting hub and clamp. Other means may be used than those described above. For example, the mirrors may be attached with a mounting system such as the Tie-Dex Clamping System which uses one piece stainless steel bands.

Though not shown, those of skill in the art will appreciate that in one or more embodiments, one or more control units are utilized to control the "x" and "y" scanning galvanometers 148,150. Such control unit(s) may be arranged to provide an input signal in the form of an applied voltage for operating each galvanometer 148,150 and actuating the movement of the associated mirrors 130,132.

The "x" and "y" scanning galvanometers 148,150 are arranged to move their respective mirrors 130,132 so as to scan the combined beam across the film surface. The rate of travel of the beam may be referred to as the "scan rate." In accordance with an embodiment of the invention, the "x" scanning galvanometer 148 is arranged to operate at a scan rate of about 400 Hz. The "y" scanning galvanometer 150 is arranged to operate at a scan rate of about 0.12–0.18 Hz.

In one or more embodiments, the "x" and "y" scanning galvanometers 148,150 are arranged to move their associated mirrors 130,132 by a minimum value. In one embodiment, the "x" scanning galvanometer is arranged to move its associated mirror 130 by no less than about +2.5 mm about the scan axis (i.e. "y"-axis). In one or more embodiments, the "y" scanning galvanometer is arranged to move its associated mirror 132 by no less than about +2.5 mm about the scan axis (i.e. "z"-axis).

In one or more embodiments, a manual or automated mirror position adjustment is provided. Referring to FIGS. 4 and 5, the "x" scanning galvanometer is provided with coarse and fine rotational adjustment settings for the mirror 130. Referring to FIGS. 6 and 7; the "y" scanning galvanometer is provided with coarse and fine rotational adjustment settings for the mirror 132. These coarse and fine rotational adjustment settings may be, for example, commercially available micrometers (i.e., fine precision screws that can be manually or motor turned.)

A number of preferred specifications for the "x" scanning galvanometer 148 are as follows: (1) active scan angle, 5° optical, ptp; (2) scan efficiency 50%; (3) command waveform modified triangle; (4) command voltage ±10V, ptp; (5) command voltage noise <1 mV; (6) at least 870 pixels per line; (7) <1 mV position detector noise; (8) >100,000/1 signal to noise ratio in closed loop; (9) <10 $\mu$Rad jitter; (10) <10 $\mu$Rad wobble; and (11) a power supply of ±18V.

A number of preferred specifications for the "y" scanning galvanometer 150 are as follows: (1) active scan angle, 10° optical, ptp; (2) scan efficiency 90% of scan angle; (3) command waveform raster; (4) command voltage ±10V, ptp; (5) command voltage noise <800 $\mu$V; (6) <800 $\mu$V position detector noise; (8) >80,000/1 signal to noise ratio in closed loop; (9) <10 $\mu$Rad jitter; (10) <10 $\mu$Rad wobble; and (11) a power supply of ±18V.

In accordance with the present invention, the separation or "decoupling" of the multiple galvanometers has the observed effect of permitting exacting control over beam placement and avoiding film exposure errors (such as banding, placement and the like observed in when exposing film using the arrangement of galvanometers illustrated in FIG. 1). These benefits are realized at high scan frequencies, such as the stated 400 Hz frequencies listed above. This permits high speed scanning, and thus film production.

Of course, the foregoing description is that of one or more embodiments of the invention, and various changes and modifications may be made without departing from the spirit and scope of the invention, as defined by the claims.

What is claimed is:

1. A system for deflecting an energy beam comprising:
   a first reflective surface for directing an incident beam;
   a first galvanometer coupled to said first reflective surface for rotating said first reflective surface about a first axis;
   a collimating lens positioned ahead of the first reflective surface for directing the incident beam to the first reflective surface;
   a second reflective surface for directing said incident beam after directed by said first reflective surface;
   a second galvanometer coupled to said second reflective surface for rotating said second reflective surface about a second axis, said second galvanometer positioned remote from said first galvanometer; and
   a scan lens positioned between said first and second reflective surfaces so that said incident beam passes through said scan lens from said first reflective surface to said second reflective surface,
   wherein said incident beam comprises combined red, green and blue laser beams, and
   wherein rotors of said first and second galvanometers are supported on flexures or springs.

2. The system in accordance with claim 1 wherein said first axis and second axis are generally perpendicular to one another.

3. The system in accordance with claim 1 wherein said system is part of a laser film recorder and said incident beam is reflected onto a film.

4. The system in accordance with claim 1 wherein said first and second galvanometers are movably mounted with respect to a support surface.

5. A system for deflecting an energy beam comprising:
   a first reflective surface for directing an incident beam;
   a first galvanometer coupled to said first reflective surface for rotating said first reflective surface about a first axis;
   a second reflective surface for directing said incident beam after directed by said first reflective surface;
   a second galvanometer coupled to said second reflective surface for rotating said second reflective surface about a second axis, said second galvanometer positioned remote from said first galvanometer; and
   a scan lens positioned between said first and second reflective surfaces so that said incident beam passes through said scan lens from said first reflective surface to said second reflective surface,
   wherein said system is part of a laser film recorder and said incident beam is reflected onto a film after being reflected by said second reflective surface,
   wherein said incident beam comprises combined red, green and blue laser beams, and
   wherein rotors of said first and second galvanometers are supported on flexures or springs.

6. A system for deflecting an energy beam comprising:
   a first reflective surface for directing an incident beam;
   a first galvanometer coupled to said first reflective surface for rotating said first reflective surface about a first axis;
   a second reflective surface for directing said incident beam after directed by said first reflective surface;
   a second galvanometer coupled to said second reflective surface for rotating said second reflective surface about a second axis, said second galvanometer positioned remote from said first galvanometer, wherein said first and second galvanometers are movably mounted with respect to a support surface; and
   a scan lens positioned between said first and second reflective surfaces so that said incident beam passes through said scan lens from said first reflective surface to said second reflective surface.

7. A method of deflecting an energy beam comprising:
   directing an incident beam onto a first reflective surface;
   rotating said first reflective surface about a first axis with a first galvanometer coupled to said first reflective surface;
   directing said incident beam from said first reflective surface with said first galvanometer through a scan lens to a second reflective surface;

rotating said second reflective surface about a second axis with a second galvanometer located remotely from said first galvanometer, wherein said incident beam comprises combined red, green and blue laser beams, and wherein rotors of said first and second galvanometer are supported on flexures or springs.

8. The method in accordance with claim 7 wherein said first axis and second axis are generally perpendicular to one another.

9. A laser film recorder comprising:

a first laser for generating a red laser beam;

a second laser for generating a blue laser beam;

a third laser for generating a green laser beam;

at least one beam deflector for deflecting said red, blue and green laser beams into a combined and collinear beam;

a first reflective surface for directing the combined and collinear beam;

a first galvanometer coupled to said first reflective surface for rotating said reflective surface about a first axis and changing a direction of said combined and collinear beam;

a collimating lens positioned ahead of the first reflective surface for directing the incident beam to the first reflective surface;

a second reflective surface for directing said combined and collinear beam after directed by said first reflective surface;

a second galvanometer coupled to said second reflective surface for rotating said second reflective surface about a second axis; said first and second galvanometers located apart from one another;

a scan lens positioned between said first and second reflective surfaces so that said combined and collinear beam passes through said scan lens from said first reflective surface to said second reflective surface; and a film surface at which said combined and collinear beam is directed by said second reflective surface.

10. The laser film recorder in accordance with claim 9 wherein said first axis and second axis are generally perpendicular to one another.

11. A system for deflecting an energy beam comprising:

a first reflective surface for directing an incident beam;

a first galvanometer coupled to said first reflective surface for rotating said first reflective surface about a first axis;

a second reflective surface for directing said incident beam after directed by said first reflective surface;

a second galvanometer coupled to said second reflective surface for rotating said second reflective surface about a second axis, said second galvanometer positioned remotely from said first galvanometer, wherein said incident beam comprises combined red, green and blue laser beams, and wherein rotors of said first and second galvanometers are supported on flexures or springs.

12. The system in accordance with claim 11, further comprising a scan lens positioned between said first and second reflective surfaces so that said incident beam passes through said scan lens from said first reflective surface to said second reflective surface.

13. The system in accordance with claim 11, wherein said first axis and second axis are generally perpendicular to one another.

14. The system in accordance with claim 11, wherein said system is part of a laser film recorder and said incident beam is reflected onto a film.

15. The system in accordance with claim 11, wherein said first and second galvanometers are movably mounted with respect to a support surface.

16. A method of deflecting an energy beam, said method comprising:

directing an incident beam onto a first reflective surface;

rotating said first reflective surface about a first axis with a rotor of said first galvanometer, wherein said rotor is supported on flexures or springs and coupled to said first reflective surface;

directing said incident beam from said first reflective surface with said first galvanometer to a second reflective surface;

rotating said second reflective surface about a second axis with a rotor of a second galvanometer, wherein said rotor is supported on flexures or springs, said second galvanometer being located remotely from said first galvanometer, wherein said incident beam comprises combined red, green and blue laser beams.

17. A laser film recorder comprising:

a first laser for generating a red laser beam;

a second laser for generating a blue laser beam;

a third laser for generating a green laser beam;

at least one beam deflector for deflecting said red, blue and green laser beams into a combined and collinear beam;

a first reflective surface for directing the combined and collinear beam;

a first galvanometer coupled to said first reflective surface for rotating said reflective surface about a first axis and changing a direction of said combined and collinear beam, said first galvanometer being supported on first flexures or springs;

a second reflective surface for directing said combined and collinear beam after directed by said first reflective surface;

a second galvanometer coupled to said second reflective surface for rotating said second reflective surface about a second axis, wherein said second galvanometer is supported on second flexures or springs and said first and second galvanometers are located apart from one another; and a film surface at which said combined and collinear beam is directed by said second reflective surface.

18. The laser film recorder in accordance with claim 17, wherein said first axis and second axis are generally perpendicular to one another.

* * * * *